United States Patent [19]

Oezelli et al.

[11] Patent Number: 4,569,961

[45] Date of Patent: Feb. 11, 1986

[54] POLYURETHANE LACQUERS CONTAINING NITROSO-AROMATICS

[75] Inventors: Riza N. Oezelli, Neuss; Hartmut Lippert, Monheim, both of Fed. Rep. of Germany

[73] Assignee: Henkel Kommanditgesellschaft auf Aktien, Duesseldorf, Fed. Rep. of Germany

[21] Appl. No.: 689,630

[22] Filed: Jan. 8, 1985

[30] Foreign Application Priority Data

Jan. 12, 1984 [DE] Fed. Rep. of Germany ....... 3400852

[51] Int. Cl.$^4$ .............................................. C08G 18/38
[52] U.S. Cl. .................................... 524/186; 523/175; 523/219; 523/220; 523/221; 524/871; 528/52
[58] Field of Search ................. 524/186, 871; 528/52; 523/175, 219–221

[56] References Cited

U.S. PATENT DOCUMENTS

| | | | |
|---|---|---|---|
| 2,905,582 | 9/1959 | Coleman et al. | 525/128 |
| 3,268,479 | 8/1966 | Martel | 260/59 |
| 3,282,383 | 11/1966 | DeCrease et al. | 524/197 |
| 3,734,886 | 5/1973 | Dodman et al. | 524/186 |
| 3,830,784 | 8/1974 | Manino et al. | 260/77.5 R |
| 3,878,134 | 4/1975 | Ozelli et al. | 260/4 R |
| 4,053,537 | 10/1977 | Ruprecht et al. | 524/871 |
| 4,088,622 | 5/1978 | Pearl | 523/175 |
| 4,308,071 | 12/1981 | Gervase | 524/871 |
| 4,448,835 | 5/1984 | Yamaguchi | 428/147 |
| 4,508,128 | 4/1985 | Kowalik et al. | 523/175 |

FOREIGN PATENT DOCUMENTS 1167191  5/1984  Canada .

OTHER PUBLICATIONS

G. Klement in "Kautschuk und Gumni–Kunststoffe", vol. 23 (1970), Number 8, pp. 275 to 378.
J. Brandrup and E. Immergut, "Polymer Handbook", J. Wiley & Sons, New York, 2nd Edition IV, 241 (1975).

*Primary Examiner*—Herbert S. Cockeram
*Attorney, Agent, or Firm*—Ernest G. Szoke; Henry E. Millson, Jr.; Mark A. Greenfield

[57] ABSTRACT

An improved polyurethane lacquer for coating an elastomer containing at least one polyfunctional aromatic nitroso compound as an adhesion improver and optionally, lacquer-nonreactive spacer particles.

24 Claims, No Drawings

POLYURETHANE LACQUERS CONTAINING NITROSO-AROMATICS

BACKGROUND OF THE INVENTION

1. Field of the Invention

This invention relates to polyurethane lacquers containing polyfunctional aromatic nitroso compounds to improve their adhesion to elastomer substrates.

2. Statement of the Related Art

The lacquering of elastomers with polyurethane based lacquers has long been known, cf. G. Klement in "Kautschuk und Gummi-Kunststoffe", Vol. 23 (1970), Number 8, pages 375 to 378. The lacquers described there are used primarily for increasing the weather resistance of relatively sensitive elastomers and for smoothing their surface. Lacquers for elastomers should be used in particular when the elastomer substrate is exposed to prolonged weathering and/or to mechanical stressing. Accordingly, there is a need to provide elastomer lacquers which show better adhesion, even to apolar elastomers. This applies in particular to recently developed low-friction lacquers. These are polyurethane lacquer preparations containing spherical filler particles which are several times thicker than the lacquer film and which act as spacers to reduce the friction of the lacquered elastomer, for example, with respect to glass (see U.S. Pat. No. 4,448,835).

Aromatic nitroso compounds are known per se, as is their use as a component of binders for heat-vulcanizing rubber on metal substrates (see U.S. Pat. No. 3,878,134 and corresponding German Pat. No. 2,228,544). Further, the use of aromatic nitroso compounds in a special adhesive is disclosed in Canadian Pat. No. 1,167,191 and corresponding German patent application No. 31 25 286.

DESCRIPTION OF THE INVENTION

Other than in the operating examples, or where otherwise indicated, all numbers expressing quantities of ingredients, defining ingredients, or reaction conditions used herein are to be understood as modified in all instances by the term "about".

The present invention relates to moisture-hardening one-component polyurethane lacquers for coating elastomers, consisting of polyfunctional isocyanate compounds, solvents, auxiliaries and, if desired, friction reducers, distinguished in that they also contain polyfunctional nitroso compounds as adhesion improvers.

Thus, the present invention not only improves the adhesion and water resistance of the lacquers, but also, in another embodiment, provides low friction lacquers containing spacer particles.

While the polyfunctional aromatic nitroso compounds useful in this invention are known per se and for the purposes discussed above, their use to improve the adhesion and weather resistance of polyurethane lacquers for elastomers was previously unknown and cannot in any way be suggested by their use in binders which react at the elevated temperatures needed for vulcanization of rubber.

Useful polyfunctional aromatic nitroso compounds in particular are those which are, as independent aspects: (a) mononuclear or polynuclear, (b) substituted or unsubstituted, (c) mononitroso or dinitroso in which the nitroso moieties are not on adjacent carbon atoms; or (d) a combination of any of the foregoing. Of these, the preferred independent aspects are: (a) mononuclear, (b) substituted or unsubstituted (unsubstituted being most preferred), (c) dinitroso in which the nitroso moieties are not on adjacent carbon atoms, and (d) a combination of all of the foregoing.

Substituents (on mononuclear nitroso compounds) include, but are not limited to at least one of: $C_{1-6}$-alkyl; $C_{1-6}$-alkoxy; halogens; benzyl; and cyclo-$C_{1-8}$-alkyl. Where a fused polynuclear is the base, the foregoing substituents may be on one or more of the nuclei, although an unsubstituted polynuclear is preferred.

Particular preference is attributed to the dinitroso compounds of substituted or unsubstituted polynuclear aromatics such as 1,3- or 1,4-dinitrosonaphthalenes or mononuclear aromatics such as 1,3-dinitrosobenzene, 1,4-dinitrosobenzene, 1-methyl-4-isopropyl-2,5-dinitrosobenzene, 2-methyl-1,4-dinitrosobenzene, 2-methyl-5-chloro-1,4-dinitrosobenzene, 2-fluoro-1,4-dinitrosobenzene, 2-methoxy-1,3-dinitrosobenzene, 5-chloro-1,3-dinitrosobenzene, 2-benzyl-1,4-dinitrosobenzene and 2-cyclohexyl-1,4-dinitrosobenzene.

Of the compounds mentioned, 1,4-dinitrosobenzene is preferred. It is possible to use not only the pure nitroso compound, but also preparations containing 1,4-dinitrosobenzene, such as suspensions of the compound in at least one solvent having an active substance content of 30 to 40%. Suspensions such as these are commercially available. Similar preparations may be used for the other nitroso compounds.

The polyfunctional aromatic nitroso compounds are used in the lacquers in a quantity effective to measurably improve the adhesion and water resistance of the polyurethane lacquers, particularly in quantities of 0.5 to 4% by weight, based on the weight of the solvent-free lacquer resins. Quantities of from 1 to 2.5% by weight are preferred. In a preferred embodiment, the invention relates to one-component low friction polyurethane lacquers for elastomers. Low friction lacquers such as these contain as friction reducers solids, preferably spherical in shape, with an average diameter of from 30 to 200 $\mu$m, preferably from 30 to 150 $\mu$m. As used herein, $\mu$m means "micrometer" which is equivalent to "micron". The use of smaller particles results in a deterioration in the friction-reducing properties, whereas the use of particles larger than 200 $\mu$m in diameter, although guaranteeing the favorable properties of the lacquered elastomers, makes the lacquers very difficult to apply by spraying.

Previously, no investigations are known to have been conducted to explain the reduction in the coefficient of friction of elastomers coated with low friction lacquers of the type in question. However, it is assumed that, after the lacquer has hardened, the incorporated solids project beyond the surface of the lacquer film and act as spacers to a substrate sliding past. Accordingly, the reduction in the friction coefficient is at least partly brought about by a reduction in the area of contact. Low friction lacquers of the type in question are usually applied in a layer thickness of from 10 to 50 $\mu$m, which itself limits the acceptable sizes of the spacer particles to those indicated.

A variety of materials which can be produced in spherical, or at least rounded, form are suitable for use as the solid spacers, provided that they are nonreactive with the lacquer. Thus, in one embodiment of the invention, roughly spherical polymer particles are used. Suitable spherical polymer particles are those which are produced by suspension polymerization and which are at least approximately equal in diameter. It is possible to use spherical polyolefins having a particle diameter in the above-mentioned range. Suitable polyolefins are polyethylene, polypropylene or polystyrene. Spherical acrylate-based polymers are also suitable. Thus, spherical polymethyl methacrylate for example may be used. It is also possible to use spherical inorganic minerals such as inorganic glasses in spherical form or metal beads, such as aluminum, in each case with the required particle diameter. In selecting a suitable material for the spacers, the lacquer expert has to bear the following in mind:

In the case of polymers, the lacquer solvent must be a non-solvent for the polymer. Reference is made in this connection to the known literature in tabular form in which solvents and non-solvents for polymers are listed, for example J. Brandrup and E. Immergut, "Polymer Handbook", J. Wiley & Sons, New York, 2nd Edition IV, 241 (1975). Where inorganics such as glasses are used as the spacers, it must be taken into account that they can have an abrasive effect on numerous substrates. Accordingly, low-friction lacquers containing spherical glass particles are better suited to special applications. The use of metals gives the lacquered elastomer a metallic sheen.

Preferred spacers for the purposes of the invention are spherical particles of chlorinated polymers, for example spherical PVC particles. In this context, spherical means that, for the most part at least, the particles have a round, spherical or ellipsoidal surface, i.e. for the most part at least are free from sharp points and edges. PVC particles such as these are readily obtainable, being produced by suspension polymerization. In the field of suspension polymerization, particularly of vinyl chloride, there is extensive specialist knowledge, enabling particles to be produced in sizes and size distributions variable within wide limits.

Although spherical PVC-particles having a wide particle size distribution, i.e. mixtures of particles of different diameter, may be used as spacers for the purposes of the invention, it is nevertheless preferred to use particles having a narrow particle size distribution, i.e. particles of substantially the same size. PVC industrially produced by suspension polymerization generally has the narrow particle size distribution required and may therefore be used providing its average particle diameter is in the claimed range.

The term PVC is used here for polyvinyl chloride but also includes copolymers of vinyl chloride providing they consist predominantly of vinyl chloride or are generally referred to as PVC. PVC types particularly suitable for the purposes of the invention are, for example, Vinoflex S6115, a product of Wacker-Chemie, and also GEON 221, a product of the B. F. Goodrich Company. These products have the requisite average particle size as measured by a simplified process commonly used in the lacquer industry, in which a lacquer film filled with pigment particles is drawn out in a standardized apparatus from a layer thickness of about 300 μm to 0 to ascertain the layer thickness at which the pigment particles break through the lacquer surface.

Lacquers according to this invention should contain the spacer particles in an amount not more than 50%, preferably not more than 35%, more preferably not more than 25% by weight. If the solid spacer particles are used in a quantity less than 5%, the friction-reducing properties gradually deteriorate. For most purposes, a preferred range is 5 to 20%, most preferred being 7 to 15%, and 10% being ideal. All percentages above are by weight, based on the total weight of the lacquer solids.

In order to achieve favorable friction-reducing properties, the thickness of the beads and the thickness of the lacquer layer have to be coordinated with one another. Although a reduction in the coefficient of friction is observed when the thickness of the lacquer layer is varied over a wide range of from 5 to 50% of the bead thickness, it is nevertheless preferred to adjust the thickness of the lacquer layer to between 10 and 20% of the bead thickness. The layer thickness of the lacquer may be adjusted by any of the methods known in the art. Thus, it is possible to vary the spraying time, the quantity applied or even the solids content of the lacquer.

The one-component moisture-hardening polyurethane lacquers according to the invention contain as binders, polyurethane prepolymers having on average 2 or more isocyanate groups per molecule. Prepolymers such as these are well known and are used in numerous fields, such as adhesives. The polyurethane prepolymers are produced by mixing alcohols having a functionality of 2 or higher with an excess of isocyanate compounds having a functionality of 2 or higher. The viscosity of the products may be determined by the quantities in which the alcohols and the isocyanate compounds are used. If 2 mols of NCO-groups are used per mol of OH group, low molecular weight, relatively low-viscosity mixtures are obtained. If the ratio of OH to NCO approaches equivalence, increasingly more viscous products are formed. In the production of polyurethane prepolymers for lacquers, the expert will select the OH:NCO ratio and hence viscosity such that lacquers containing from 30 to 40% by weight of the polyurethane prepolymer can still be applied by spraying. Accordingly, a favorable OH:NCO ratio is 1:1.3–1.8. Diisocyanates are particularly suitable for producing the polyurethane prepolymers. Mononuclear and polynuclear aromatic diisocyanates, cyclic aliphatic diisocyanates or linear aliphatic diisocyanates may be used. Thus, it is possible to use diphenyl methane diisocyanate, relatively highly condensed (technical) diphenylmethane diisocyanate (functionality 2.3), tolylene diisocyanate, isophorone diisocyanate, dicyclohexylmethane diisocyanate, tetramethylene diisocyanate or hexamethylene diisocyanate. Dihydric alcohols, such as ethylne glycol, propylene glycol, neopentyl glycol, 1,4-butane diol, 1,6-hexane diol, may be used as the polyhydric alcohol components. It is also possible to use trihydric alcohols either entirely or at least in quantities of up to 50% by weight, based on the total weight of the polyhydric alcohols. Suitable trihydric alcohols are glycerol, trimethylol ethane, trimethylol propane. Particularly suitable dihydric alcohols are the condensation products of the above compounds. Thus, polypropylene glycol having an average molecular weight of from about 100 to 10,000 and preferably from 800 to 2500 is one example of a suitable diol. Other suitable diols are polyethylene oxides having a molecular weight in the same range and polymers of tetrahydrofuran having a molecular weight of up to 5000.

In addition to the polyols mentioned in the foregoing many other polyols are utilizable. Thus, it is possible to use naturally occurring polyols, such as castor oil. The ring-opening products of ethoxylated triglycerides with monohydric or polyhydric alcohols may also be used.

The mechanism by which the lacquers according to the invention harden is moisture hardening, i.e. inwardly diffusing water vapor hydrolyzes individual isocyanate groups which then react with other isocyanate groups to form urea groups.

The polyurethane lacquers according to the invention also contain solvents. The use of solvents is of particular benefit to application of the lacquers. Thus, if the lacquer is to be applied by spraying, a given viscosity has to be achieved through adjusting the quantity of solvent. Suitable solvents are organic solvents which do not react with free isocyanate groups, i.e. hydrocarbons, ketones or chlorinated hydrocarbons. The only requirement governing the choice of the solvent is that the solid added as spacer should not be dissolved or swollen. Particularly suitable solvents include xylene, toluene, methyl isobutyl ketone and ethylene glycol acetate.

In addition, the lacquers according to the invention may contain other auxiliaries. For example, retarders, accelerators, stabilizers or pigments, above all carbon black pigments, may be incorporated. These auxiliaries are known in the art and are described in the literature relating to polyurethane lacquers. In order to obtain bubble-free lacquer films, foam inhibitors are also frequently used. Once again, reference is made to the general specialist literature on the subject of polyurethane lacquers.

The invention enables both polar and apolar elastomers to be provided with a high-adhesion and durable lacquer coating.

In addition, where solids are used as spacers in the lacquers according to the invention, the invention enables different elastomers to be provided with favorable sliding properties.

Thus, one advantage of this invention lies in the fact that not only the usual polar elastomers (for example those containing nitrile groups), but also the apolar elastomers which are becoming increasingly more important, such as terpolymers based on ethylenepropylene-diene (EPDM), or even styrenebutadiene elastomers, have been provided with the spacer-containing lacquer coating. In either case, firm adhesion of lacquers and of the PVC-particles embedded therein were observed. In addition, the lacquered elastomers proved to be unaffected by moisture.

To produce the lacquers according to the invention, the prepolymers are first prepared by reacting polyhydric alcohols with an excess of the isocyanate component. After dilution with solvents, the polyfunctional aromatic nitroso compounds are then added. The solids (friction reducers) may then be incorporated in the primer thus prepared. Dispersion of the solids in the lacquer may be achieved by means of a high speed stirrer. PVC-beads may be incorporated in the lacquer particularly favorably in this way. In order to prevent the friction reducers from settling, dispersants may be added. Alternatively, settling may be prevented by stirring. In general, however, PVC beads show no tendency towards settling or suspension in lacquers. The lacquers according to the invention may be applied in the usual way by spraying. As low friction lacquers, they afford particular advantages over the state of the art processes for the electrostatic flocking of rubber profiles.

EXAMPLES

COMPARISON EXAMPLE A

A one-component polyurethane lacquer was prepared from the following components (quantities in parts by weight [PBW]):

| | |
|---|---|
| 40.1 PBW | polypropylene glycol, molecular weight 1025, OH number 109.6 |
| 238.0 PBW | polypropylene glycol, molecular weight 2025, OH number 55.4 |
| 21.1 PBW | trimethylol propane |
| 5.0 PBW | 2,6-t-butyl-4-methylphenol (Ralox BT, a product of the Raschig company) (auxiliary) |
| 195.8 PBW | diphenylmethane diisocyanate (Desmodur 44, a product of Bayer AG) |
| 125.0 PBW | xylene (solvent) |
| 125.0 PBW | toluene (solvent) |
| 220.0 PBW | methylisobutyl ketone (MIBK) |
| 30.0 PBW | ethylene glycol acetate (EGA) |
| 1000.0 PBW | |

The polypropylene glycols, the solvents toluene and xylene, trimethylol propane, and the auxiliary, Ralox BT, were weighed into a reactor. Water was azeotropically removed from the mixture under reduced pressure (500 Torr) until its water content amounted to approximately 100 ppm. After cooling to approximately 60° C., MIBK, EGA and the diisocyanate were added. The mixture was then heated to 90° C. and stirred at that temperature for 3.5 hours. It was then passed through filters at 50° C.

30 g of spherical PVC powder (Geon 221, a product of B. F. Goodrich) were then added and dispersed by means of a bead mill. Rubber plates were then sprayed with the lacquer thus produced (spray gun: Walther Pilot III, nozzle 1.0 mm or 1.5 mm, spraying pressure: 3 bars). The lacquer thus applied was dried for 10 minutes at 80° C.

The lacquer was applied to elastomer profiles based on ethylene-propylene-diene (EPDM) and styrenebutadiene (SBR). The elastomer profiles had been produced beforehand by standard vulcanization techniques from the rubber mixtures shown in Table 1.

"Keltan 812" is a trademark of DSM, Netherlands for EPDM

"Buna Huls 1500" is a trademark of Bayer AG, Germany for SBR

ZnO RS is zinc Oxide and RS means particle size 0.08 to 0.1 mm

FEF is carbon black according to ASTM-N-550 (BET 45 m$^2$/g)

"Sillitan N" is a trademark of Hoffman & Söhne, Germany for Silica

"Corax 3" is a trademark of Degussa AG, Germany for carbon black HAF, ASTM-N-330 (BET 67 m$^2$/g)

"Sunpar 2280" is a trademark of Sun Oil Co., USA for mineral oil (67% naphthenic, 33% paraffinic)

"Caloxol" is a trademark of Berkshire Chemical Co., U.S.A. for CaO (surface-treated with fatty acid)

"Paraflux" is a trademark of C. B. Hall Corp., U.S.A. for saturated polymeric hydrocarbons "Merkapto 80" is a trademark of Bayer AG, Germany for 2-Mercaptobenzothiazol "Santogard PVI" is a trademark of Monsanto Co., U.S.A. for Cyclohexylthiophthalimide DPTT is dipentamethylene thiuram tetrasulfide "P extra N 80%" is a trademark of Bayer AG, Germany for zinc-ethylphenyldithiocarbamate "Royalac 133" is a trademark of Uniroyal Inc., U.S.A. for Dithiocarbamate "Pennzone B" is a trademark of Titan-Gesellschaft, Germany for 1.3-Dibutylthiourea "Vulkacit CZ" is a trademark of Bayer AG, Germany for N-Cyclohexyl-2-benzo-thiazol-sulfonamide "Sulfasan R" is a trademark of Monsanto, U.S.A. for dithiodimorpholine

TABLE 1

| Constituents | Rubber Mixtures | |
|---|---|---|
| | EPDM | SBR |
| Keltan 812 | 100.0 parts | — parts |
| Buna Huls 1500 | — | 100 " |
| ZnO RS | 5.0 parts | 5 " |
| Stearic acid | 2.0 parts | 1 " |
| FEF | 90.0 parts | — |
| Sillitin N | 55.0 parts | — |
| Corax 3 | — | 50 |
| Sunpar 2280 | 70.00 parts | — |
| Caloxol | 6.0 parts | — |
| Paraflux | — | 8 " |
| Petroleum Jelly | 5.0 | — |
| Merkapto 80% | 1.25 parts | — |
| Santogard PVI | — | 0.2 " |
| DPTT 75% | 2.0 parts | — |
| P extra N 80% | 1.9 parts | — |
| Royalac 133 | 1.0 parts | — |
| Pennzone B | 0.5 parts | — |
| Vulkacit CZ | — | 0.95 " |
| Sulfasan R | 1.0 parts | — |
| Sulfur | — | 1.6 " |

COMPARISON EXAMPLE B

In another test, rubber profiles were produced, coated with the lacquer containing PVC beads and vulcanized in a hot air duct with simultaneous hardening of the lacquer.

In both cases, sliding properties corresponding to those of flocked rubber profiles were observed.

EXAMPLES ACCORDING TO THIS INVENTION 1,4-dinitrosobenzene was added in the following quantities to the polyurethane lacquer of the Comparison Example:
1% (Example 1)
2% (Example 3)

The lacquer was hardened for 15 minutes at 90° C. in a hot air cabinet. After the lacquered profiles had been stored for about 24 hours at room temperature, adhesion was determined by cross hatching in accordance with German Industrial Standard (DIN) 53,151. This test was repeated after the profiles had been stored for 240 hours at 40° C./100% air humidity (SWP) and for 240 hours at 90° C. The results of the tests are shown in Table 2. It will be seen that compositions using the nitroso-aromatic compounds according to this invention are distinctly superior to otherwise identical compositions without the nitroso-aromatic compounds.

TABLE II

| Lacquer | Cross-hatching adhesion | Adhesion after SWP | Adhesion after ageing in hot air |
|---|---|---|---|
| Example 1 | good | good | very good |
| Example 2 | very good | very good | very good |
| Comparison Example | good | poor | satisfactory |

We claim:

1. In a moisture-curing one-component polyurethane lacquer for coating a polar or apolar elastomer comprising at least one polyfunctional isocyanate compound, at least one solvent, and at least one auxiliary, the improvement consisting of the presence of an effective amount of at least one polyfunctional aromatic nitroso compound as an adhesion improver and wherein said lacquer further contains spacers in the form of lacquer-nonreactive solid particles which are free from sharp points and edges and have an average diameter of about 30 to 200 μm.

2. The improvement of claim 1 wherein said at least one nitroso compound is: (a) mononuclear or polynuclear; (b) substituted or unsubstituted; and (c) mononitroso or dinitroso in which the nitroso compounds are not on adjacent carbon atoms.

3. The improvement of claim 2 wherein said at least one nitroso compound is mononuclear.

4. The improvement of claim 2 wherein said at least one nitroso compound is dinitroso in which the nitroso compounds are not on adjacent carbon atoms.

5. The improvement of claim 3 wherein said at least one nitroso compound is dinitroso in which the nitroso compounds are not on adjacent carbon atoms.

6. The improvement of claim 2 wherein said at least one nitroso compound is unsubstituted.

7. The improvement of claim 5 wherein said at least one nitroso compound is unsubstituted.

8. The improvement of claim 1 wherein said at least one nitroso compound is: m-dinitrosonaphthalene; p-dinitrosonaphthalene; 1,3-dinitrosobenzene; 1,4-dinitrosobenzene; 1-methyl-4-isopropyl-2,5-dinitrosobenzene; 2-methyl-1,4-dinitrosobenzene; 2-methyl-5-chloro-1,4-dinitrosobenzene; 2-methyl-5-chloro-1,4-dinitrosobenzene; 2-fluoro-1,4-dinitrosobenzene; 2-methoxy-1,3-dinitrosobenzene; 5-chloro-1,3-dinitrosobenzene; 2-benzyl-1,4-dinitrosobenzene; 2-cyclohexyl-1,4-dinitrobenzene; or any mixture of the foregoing.

9. The improvement of claim 1 wherein said at least one nitroso compound is 1,4-dinitrosobenzene.

10. The improvement of claim 1 wherein said at least one nitroso compound is a suspension of 1,4-dinitrosobenzene in at least one solvent having an active substance content of about 30 to 40%.

11. The improvement of claim 1 wherein said at least one nitroso compound is present in a quantity effective to measurably improve the adhesion of said lacquer to said elastomer.

12. The improvement of claim 1 wherein said at least one nitroso compound is present in a quantity of about 0.5 to 4% by weight, based upon the weight of the solids content of the lacquer.

13. The improvement of claim 1 wherein said at least one nitroso compound is present in a quantity of about 1 to 2.5% by weight, based upon the weight of the solids content of the lacquer.

14. The improvement of claim 2 wherein said at least one nitroso compound is present in a quantity of about 0.5 to 4% by weight, based upon the weight of the solids content of the lacquer.

15. The improvement of claim 5 wherein said at least one nitroso compound is present in a quantity of about 1 to 2.5% by weight, based upon the weight of the solids content of the lacquer.

16. The improvement of claim 7 wherein said at least one nitroso compound is present in a quantity of about 1 to 2.5% by weight, based upon the weight of the solids content of the lacquer.

17. The improvement of claim 1 wherein said lacquer further contains spacers in the form of lacquer-nonreactive solid particles which are at least roughly spherical and have an average diameter of about 30 to 150 μm.

18. The improvement of claim 5 wherein said lacquer further contains spacers in the form of lacquer-nonreactive solid particles which are free from sharp points and edges and have an average diameter of about 30 to 150 μm.

19. The improvement of claim 7 wherein said lacquer further contains spacers in the form of lacquer-nonreactive solid particles which are at least roughly spherical and have an average diameter of about 30 to 150 μm.

20. The improvement of claim 1 wherein said particles are beads of at least one synthetic polymer, glass, mineral, metal, or a mixture of any of the foregoing.

21. The improvement of claim 1 wherein said particles are roughly spherical beads of predominantly polyvinyl chloride.

22. The improvement of claim 1 wherein said at least one polyfunctional isocyanate compound is a polyurethane prepolymer containing on average two or more predominantly terminal isocyanate groups.

23. The improvement of claim 1 wherein said at least one polyfunctional isocyanate compound is a polyurethane prepolymer based on aliphatic and/or aromatic diisocyanates and aliphatic di- or trihydric alcohols or ether alcohols.

24. The improvement of claim 23 said at least one polyfunctional isocyanate compound is a polyurethane prepolymer based on aliphatic and/or aromatic diisocyanates and aliphatic di- or trihydric alcohols or ether alcohols.

* * * * *